United States Patent [19]

Bopp et al.

[11] Patent Number: 5,200,432
[45] Date of Patent: Apr. 6, 1993

[54] POLYPHENYLENE OXIDE-RECYCLED POLYSTYRENE COMPOSITION AND METHOD

[75] Inventors: Richard C. Bopp, West Coxsackie; Daniel L. Roberts, Albany, both of N.Y.

[73] Assignee: General Electric Company, Pittsfield, Mass.

[21] Appl. No.: 929,250

[22] Filed: Aug. 13, 1992

Related U.S. Application Data

[62] Division of Ser. No. 478,099, Feb. 12, 1990, Pat. No. 5,147,894.

[51] Int. Cl.$^5$ .............................................. C08J 11/04
[52] U.S. Cl. ................................... 521/40.5; 521/47; 521/81; 521/139
[58] Field of Search ................... 521/40.5, 47, 81, 139

[56] References Cited

U.S. PATENT DOCUMENTS 3,070,554 12/1962 Nagle et al. .................. 521/40.5
5,118,561 6/1992 Gusawage et al. ............ 521/40.5

*Primary Examiner*—Morton Foelak
*Attorney, Agent, or Firm*—Andrew C. Hess

[57] ABSTRACT

A polymer composition comprises a melt compounded product of a polyphenylene oxide polymer and a recycled polystyrene material. The recycled polystyrene material exhibits a melt flow index greater than about 25 when devolatized by heating above its glass transition temperature. The polymer composition may be in various forms including extruded pellets, extruded foam, and expandable foam beads.

17 Claims, No Drawings

POLYPHENYLENE OXIDE-RECYCLED POLYSTYRENE COMPOSITION AND METHOD

This is a division of application Ser. No. 07/478,099, filed on Feb. 12, 1990, now U.S. Pat. No. 5,147,894.

FIELD OF THE INVENTION

The present invention relates to polymer compositions comprising a polyphenylene oxide polymer and a recycled polystyrene material. More particularly, the present invention relates to such compositions prepared by melt compounding a polyphenylene oxide polymer and a recycled polystyrene material, and to methods for preparation of such compositions.

BACKGROUND OF THE INVENTION

Polystyrene foam materials are well known in the art. A summary of polystyrene and related thermoplastic foams is disclosed by Ingram et al. in *Plastic Foams*, Part II, Chapter 10, edited by Frisch et al., Marcel Dekker, Inc., New York (1973). Extruded low-density foam articles comprising a mixture of polystyrene and polyphenylene oxide are also known in the art as demonstrated by the Allen et al. U.S. Pat. No. 4,857,390, the Krutchen et al. U.S. Pat. Nos. 4,535,100, 4,598,100 and 4,532,263, and German Reference No. DE 3220856. The Park U.S. Pat. Nos. 4,661,302, 4,705,811 and 4,734,441 additionally disclose the use of polyphenylene oxide to enhance the melt strength of expanded polystyrene foam board during post expansion processes.

Polystyrene materials are used in numerous industrial and consumer applications. In view of the great amount of polystyrene materials appearing in waste refuse, it is desirable to recycle post-use polystyrene materials for reuse. One type of polystyrene material which has been successfully recycled for reuse comprises polystyrene foam and solid materials which have been employed in food packaging, for example, in fast food restaurants. In one process, the used polystyrene material is sorted by hand, washed, devolatized, ground and extruded into pellets to provide a recycled material having a melt flow index of between 3 and 4 g/10 min (ASTM D-1238, Condition G). The recycled material has been used to produce injection molded non-food contact products.

However, one type of polystyrene material which has not been successfully recycled for further use comprises bromine-modified polystyrene foams. The bromine-modified polystyrene foam materials are commonly used in industrial packaging applications, for example, consumer electronics and appliances, and comprise about 60% of all polystyrene waste refuse. The bromine modifiers are, for example, compounds containing aliphatic, cycloaliphatic and aromatic bromine, and are originally included in the polystyrene foams in order to improve their processability and to serve as flame retardants for the foam materials. However, the bromine-containing compounds have relatively low thermal stability. Thus, when the bromine-modified polystyrene foam materials are heated, the bromine-containing modifiers thermally decompose. The decomposition products react with the polystyrene to cause large reductions of molecular weight, resulting in a nonusable product. Heating of the bromine-modified polystyrene foams above their glass transition temperatures causes devolatization of the foam materials and provides products having a melt flow index greater than about 25, and oftentimes having a melt flow index greater than about 100. In view of the high melt flow index of this material, such products were heretofore believed unsuitable for further practical use.

Thus, a need exists for further advances in the development and use of post-consumer polystyrene materials.

SUMMARY OF THE INVENTION

Accordingly, it is an object of the present invention to provide compositions and methods employing recycled polystyrene materials. It is a more specific object of the invention to provide compositions and methods which successfully employ recycled polystyrene materials derived from bromine-modified polystyrene foams. It is an additional object of the present invention to provide compositions which include recycled polystyrene material and which may be in the form of extruded foam products or expanded foam beads suitable for use in various applications. It is an additional object of the invention to provide polymer compositions containing recycled polystyrene material, which compositions exhibit an advantageous combination of physical properties. It is a further object of the invention to provide methods for preparing such compositions.

These and additional objects are provided by the compositions and methods according to the present invention. More particularly, the polymer compositions of the present invention comprise a melt compounded product of a polyphenylene oxide polymer and a recycled polystyrene material. In a more specific embodiment of the invention, the recycled polystyrene material comprises bromine-modified polystyrene foam and exhibits a melt flow index greater than about 25 when devolatized by heating above its glass transition temperature. While the recycled polystyrene material alone is not capable of being processed in a plasticating extruder using conventional melt compounding techniques, the compositions according to the present invention comprising the polyphenylene oxide polymer and the recycled polystyrene material may be processed in a plasticating extruder using conventional melt compounding techniques. The polymer compositions of the invention may be prepared in various forms, for example, as extruded foam or as expanded foam beads, suitable for use in a variety of applications.

These and additional objects and advantages will be further apparent in view of the following detailed description.

DETAILED DESCRIPTION

The polymer compositions according to the present invention comprise a melt compounded product of a polyphenylene oxide polymer and a recycled polystyrene material. While the recycled polystyrene material is generally not processable in a plasticating extruder using conventional melt compounding techniques, the combination of the polyphenylene oxide polymer and the recycled polystyrene material provides a mixture which may be melt compounded using conventional plasticating extruder apparatus.

Polyphenylene oxide polymers adapted for use in the polymer compositions of the present invention comprise polymers and copolymers having repeated structural units of the following general formula:

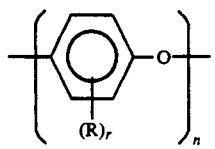

wherein each R individually represents a monovalent substituent such as hydrogen, halogen, alkyl, aryl, alkoxy and other hydrocarbon groups, r is from 1 to 4 and n represents the degree of polymerization. Preferably, n is at least 20, and more preferably, n is at least 50.

The polyphenylene oxide polymers suitable for use in the polymer compositions of the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 and in the Stamatoff U.S. Pat. Nos. 3,257,357 and 3,257,358, all of which are incorporated herein by reference. Throughout the Specification and Claims the term "polyphenylene oxide polymer" includes unsubstituted polyphenylene oxide polymers, substituted polyphenylene oxide polymers and polyphenylene oxide copolymers.

Preferred polyphenylene oxide polymers adapted for use in the polymer compositions of the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4- phenylene)ether; poly( 2,6-diethoxy- 1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; copolymers thereof, and the like. Particularly preferred polyphenylene oxide polymers for use in the compositions of the present invention include poly(2,6-dimethyl-1,4-phenylene) ether, poly(2,3,6-trimethyl-1,4-phenylene)ether, and blends of or copolymers including units of 2,3,6-trimethyl-1,4-phenylene ether and units of 2,6-dimethyl-1,4-phenylene ether. Examples of such polymers and copolymers are set forth in U.S. Pat. No. 4,806,297.

The polymer compositions of the present invention also include a recycled polystyrene material. In the present specification and claims, the term "recycled" refers to polystyrene material which has served its intended use and would otherwise be discarded as waste refuse. Preferably, the recycled polystyrene material is derived from bromine-modified polystyrene foam which is well known in the art and exhibits a melt flow index greater than about 25 when devolatized by heating above its glass transition temperature. Generally, bromine-modified polystyrene foam contains bromine compounds having relatively low thermal stability. The bromine compounds improve the processability of the polystyrene foam materials and also serve as flame retardants. The polystyrene foam materials may also include additional synergistic flame retardants, for example, organic peroxide compounds such as dicumyl peroxide, and nucleating agents which also exhibit low thermal stability. The polystyrene materials are generally amorphous, and when devolatized by heating above their glass transition temperature, the materials exhibit a significant increase in their melt flow index. Generally, when devolatized by heating above their glass transition temperature, the bromine-modified polystyrene foam materials exhibit melt flow indices greater than about 25, 50 or even 100. Throughout the present specification and claims, reference to melt flow index refers to the property measured according to ASTM D-1238, Condition G (200° C., 5 kg). The high melt flow indices exhibited by these materials upon devolatization by heating above their glass transition temperature indicate that the bromine-modified polystyrene foam materials are not processable according to conventional melt compounding techniques.

However, in accordance with the present invention, when the recycled polystyrene material is combined with a polyphenylene oxide, the resulting mixture may be melt compounded using conventional techniques to provide a polymer composition product suitable for use in various forms and in various applications.

The recycled polystyrene material which is combined with the polyphenylene oxide polymer may comprise various forms of bromine-modified polystyrene foam which is either devolatized by heating above its glass transition temperature prior to melt compounding with the polyphenylene oxide polymer or is devolatized by heating above its glass transition temperature during the melt compounding process. For example, the bromine-modified polystyrene foam may comprise bromine-modified polystyrene extruded foam, bromine-modified expanded polystyrene foam beads, or the like.

The polyphenylene oxide is included in the polymer compositions of the invention in an amount sufficient to improve the rheological properties of the recycled polystyrene material. More specifically, the polyphenylene oxide is included in the polymer compositions in an amount sufficient to render the recycled polystyrene material processable in a plasticating extruder. Preferably, the polymer compositions of the invention comprise at least about 20 weight percent of the polyphenylene oxide, based on the polyphenylene oxide and the recycled polystyrene material. More preferably, the compositions comprise from about 35 to about 80 weight percent of the polyphenylene oxide and from about 65 to about 20 weight percent of the recycled polystyrene material, based on the polyphenylene oxide and the recycled polystyrene material.

The polymer compositions of the present invention may further include additional components. For example, the compositions may include a second polystyrene resin which is different from the recycled polystyrene material. The second polystyrene resin may be any polystyrene known in the art, including but not limited to polystyrene homopolymers, halogenated polystyrenes, styrene-maleic anhydride copolymers, rubber modified polystyrenes, acrylonitrile-butadiene-styrene copolymers, styrene-acrylonitrile copolymers, poly-alpha-methylstyrene polymers, and mixtures thereof.

Additionally, the polymer compositions of the invention may contain one or more conventional additives known in the art. Such additives include, among others, reinforcing agents and fillers, plasticizers, impact modifiers, flame retardants, lubricants, colorants, thermal stabilizers, light stabilizers, antistatic agents and the like.

The polymer compositions of the invention are prepared by melt compounding the polyphenylene oxide polymer and the recycled polystyrene material. As described above, the recycled polystyrene material may comprise bromine-modified polystyrene foam which has been devolatized by heating above its glass transition temperature prior to melt compounding with the polyphenylene oxide polymer. The bromine-modified polystyrene foam may be in the form of polystyrene extruded foam, expanded polystyrene foam beads, or the like. Alternatively, the recycled polystyrene material may be devolatized by heating above its glass transition temperature during the melt compounding process. In this embodiment, wherein the recycled polystyrene material is devolatized during the melt compounding process, it is advantageous that the recycled polystyrene material is in the form of a granulated foam. Additionally, it may be advantageous to pressure compact the recycled polystyrene material either before or after granulation.

Subsequent to melt compounding, the polymer compositions of the invention may be further processed into various forms depending on the desired application of the compositions. For example, the melt compounded product may be formed into an extruded cellular foam for various applications in the automotive industry and/or the building and construction industry, including automotive headliners, insulation, wall panels, curtain wall and flooring. In a preferred embodiment, the polymer compositions of the invention are formed into low density extruded cellular foams having a density in the range of from about 1.0 to about 30 lb/ft$^3$. The cellular foams may be formed using conventional foam extrusion methods and apparatus. Suitable blowing agents for use in preparing the cellular foams comprise halogenated hydrocarbons, for example the Freon® chlorofluorocarbon compounds, and/or non-halogenated hydrocarbons including, for example, pentane, and/or other blowing agents known in the art.

Additionally, the polymer compositions of the present invention comprising the melt compounded product may be granulated or pelletized for further use. For example, the melt compounded product may be formed into micropellets or granulated into small particles to form expandable foam beads. Such beads may be formed by imbibing the micropellets or small particles with a suitable blowing agent, for example, a halogenated hydrocarbon such as a Freon® compound, a non-halogenated hydrocarbon blowing agent, for example pentane, or any other blowing agent known in the art. The resulting expandable imbibed beads may be expanded, and the resulting expanded beads may be fused into a foamed article in accordance with methods well known in the art.

The compositions according to the present invention may also be employed in the formation of various articles using any conventional thermoplastic forming technique, including, among others, injection molding, compression molding, blow molding, structural foam molding, sheet or profile extrusion, and the like.

The compositions and methods according to the present invention are illustrated by the following examples.

EXAMPLE 1

This example demonstrates the preparation of a polymer composition according to the present invention.

The recycled polystyrene material employed in this composition comprised a bromine-modified expanded polystyrene material which had been devolatized by heating above its glass transition temperature. The recycled polystyrene had a melt flow index greater than 100 and was in the form of a granulated material. The polyphenylene oxide polymer employed in this composition exhibited an intrinsic viscosity of 0.40 dl/g (in chloroform at 25° C.). The composition was prepared from 50 weight percent of the polyphenylene oxide polymer and 50 weight percent of the recycled polystyrene material. The composition was made on a Werner-Pleiderer 53 mm twin screw extruder at 325 rpm using a throughput rate of 250 to 280 lbs/hr. A vacuum of 23 inches Hg was applied at barrel 10 of the apparatus to aid in devolatization. The resulting extrudate had a measured temperature ranging from about 574 to 577° F. and was cooled in water and pelletized.

EXAMPLE 2

This example demonstrates the preparation of an extruded low density foam board using the melt compounded product of Example 1. Specifically, the foam board was prepared from 50 weight percent of the melt compounded product of Example 1 and 50 weight percent of additional recycled polystyrene material designated PA105 and supplied by Plastics Again, Inc. of Leominster, Mass. The PA105 material was derived form the recycle of non-bromine containing polystyrene. Freon-12® was used as the blowing agent in an amount of 13.5 lb/hr. The foam extrusion was carried out on an Egan tandem 2.5-inch/ 3.5-inch diameter single screw extruder foam line fitted with board forming and take-off equipment. The resulting foam board had an approximate width of 70 cm and an approximate thickness of 4 cm. The board was characterized for density, cell dimensions in the machine (x-axis), cross-machine (y-axis), and ventrical (z-axis) directions according to ASTM D-3576 and percent open cells using a Beckman Model 930 air comparison pycnometer at three equidistant points across the board width designated A, B and C, 30 days after manufacture (30 D.A.M.). Additionally, 30 days after manufacture, the center of the foam board (position B) was subjected to measurement of selected physical properties. Specifically, the softening temperature was determined using a modified Vicat procedure in which a rectangular sample measuring approximately 3/16 inch in depth, ¼ inch in width and 1 inch in length was placed under an applied stress of 21.3 psi by a ⅛ inch diameter steel cylinder. The modified Vicat softening temperature is defined as that temperature at which the sample deflects 1 mm while being heated at 2° C./min in a circulating oil bath. The compression strength was measured on 3 inch square foam blocks at 0.1 inch/min crosshead speed using an Instron Model 1125 universal testing machine interfaced with a Series IX computerized data acquisition and analysis system. The flexural stress at 5% deflection and modulus were also measured on the Instron tester. The flex test was carried out on 3 inch by 12 inch specimens (10 inch span) cut to a 1 inch thickness. The crosshead speed was 0.02 in/min. Each sample was tested with the uncut surface positioned on the tension side of the flexural beam. The results of these measurements are set forth in Table I.

TABLE I

| PROPERTIES 30 D.A.M. | | | |
|---|---|---|---|
| | A | B | C |
| Density (lb/ft$^3$) | 2.59 | 2.59 | 2.59 |
| Average | 2.56 | | |
| % Open Cells | 9.3 | 9.7 | 9.7 |
| Average | 9.6 | | |
| Cell Dimensions (mm): (ASTM D-3576) | | | |
| x-axis | 0.97 | 0.70 | 0.61 |
| y-axis | 0.70 | 0.70 | 0.61 |
| z-axis | 0.70 | 0.61 | 0.54 |
| Average | 0.79 | 0.67 | 0.59 |
| Grand Average | 0.68 | | |
| Modified Vicat Softening Temperature (21.3 psi, 1 mm deflection), °F.: | | 238.9 (1.6) | |
| Compression Strength (psi) @ 10% Deformation | | 33.3 (5.0) | |
| Flexural Stress at 5% Deflection (psi): | | | |
| Machine Direction | | 60.9 (4.2) | |
| Cross Machine Direction | | 64.7 (4.0) | |
| Flexural Modulus (psi): | | | |
| Machine Direction | | 2860 (570) | |
| Cross Machine Direction | | 2730 (320) | |

NOTE: () indicate standard deviation values.

EXAMPLE 3

In this example, an extruded low density foam board was prepared generally in accordance with the method described in Example 2. The foam board of this example was prepared from a composition comprising 50 parts by weight of the melt compounded product from Example 1 and 50 parts by weight virgin polystyrene comprising Dylene TM 8,80 supplied by Arco Chemical Co. Additionally, a nucleant comprising 40% Mistron ZSC talc concentrate was added in the amount of 1.4 parts per hundred parts by weight resin. The Freon-12® blowing agent was employed in an amount of 13.3 lb/hr. The overall appearance of the foam board resulting from this example was indistinguishable from a foam board prepared according to a similar method using a composition comprising 25 weight percent polyphenylene oxide and 75 weight percent virgin polystyrene. A predominantly closed-cell sample and a 45% open-cell sample of the foam board of this example were also subjected to measurement of the properties described in Example 2, at 30 DAM. The results of these measurements are set forth in Table 2.

TABLE II

| PROPERTIES 30 D.A.M. | | | | | | |
|---|---|---|---|---|---|---|
| | (Closed Cell) | | | (Open Cell) | | |
| | A | B | C | A | B | C |
| Density (lb/ft$^3$) | 3.27 | 3.17 | 3.18 | 3.17 | 3.14 | 3.30 |
| Average | 3.21 | | | 3.20 | | |
| % Open Cells | 6.7 | 3.5 | 3.2 | 51.5 | 40.8 | 44.0 |
| Average | 4.5 | | | 45.4 | | |
| Cell Dimensions (mm): (ASTM D-3576) | | | | | | |
| x-axis | 0.23 | 0.27 | 0.24 | 0.27 | 0.26 | 0.27 |
| y-axis | 0.26 | 0.27 | 0.24 | 0.30 | 0.29 | 0.29 |
| z-axis | 0.30 | 0.32 | 0.32 | 0.35 | 0.37 | 0.32 |
| Average | 0.26 | 0.29 | 0.27 | 0.31 | 0.31 | 0.29 |
| Grand Average | 0.27 | | | 0.30 | | |
| Modified Vicat Softening Temperature (21.3 psi, 1 mm deflation), °F.: | 247.4 | (1.7) | | 246.7 | (2.2) | |
| Compression Strength (psi) @ 10% Deformation | 91.9 | (8.6) | | 83.7 | (8.3) | |
| Flexural Stress at 5% Deflection (psi): | | | | | | |
| Machine Direction | 64.1 | (10.3) | | 71.4 | (0.9) | |
| Cross Machine Direction | 96.7 | (34.8) | | 74.6 | (3.4) | |
| Flexural Modulus (psi): | | | | | | |
| Machine Direction | 2360 | (420) | | 2770 | (140) | |
| Cross Machine Direction | 4050 | (780) | | 3870 | (320) | |

NOTE: () indicate standard deviation values.

The results set forth in Table I and Table II demonstrate that cellular foam products prepared from the compositions according to the present invention exhibit good compressive and flexural properties.

EXAMPLE 4

This example demonstrates the preparation of expandable foam beads from a polymer composition according to the present invention. A mixture of 3.4 kg of the recycled polystyrene material described in Example 1 and an equal quantity of powdered polyphenylene oxide polymer having an intrinsic viscosity of 0.46 dl/g (chloroform, 25° C) was prepared in a high intensity Henschel mixer. The mixture was melt compounded using a 30 mm Werner-Pleiderer twin screw extruder, extruded through a 15-strand microdie (approximately 0.040 inch hole diameters) and pelletized. The feed rate varied between about 10 and 35 lbs/hr while the extruder operated at a constant 350 rpm. The melt temperature near the die was measured at about 328° C.

The resulting "micropellets" were then imbibed with a blowing agent. More particularly, 75 g of the micropellets were sieved through a No. 16 screen (14 mesh) and charged into a 300 ml reactor containing 150 ml deionized water, 1.2 g polyvinyl alcohol, and 9.6 g n-pentane. The reactor was sealed and the contents were agitated at approximately 800 rpm. The reactor was then heated to 95° C., maintained at this temperature for 1 hour, heated to 135° C. and maintained at this temperature for 4 hours. The reactor was then cooled to room temperature. As a result of this process, the substantially cylindrical micropellets were transformed to substantially spherical imbibed beads. The imbibed beads were then washed with tap water, dried under ambient conditions and screened.

Small quantities of the imbibed beads were placed in a stainless steel tray and expanded in a hot air oven at 70, 300 or 325° F for a period of 2, 3 or 5 minutes. The bulk density of the resulting expanded beads was then measured by weighing a prescribed volume in a graduated cylinder. The results of these measurements are set forth in Table III.

TABLE III

| | FOAM BEAD DENSITY (LB/FT$^3$) | | |
|---|---|---|---|
| Oven Temp. (°F.) | 2 min. | 3 min. | 5 min. |
| 270 | 8.1 | 7.1 | 6.2 |

TABLE III-continued

| Oven Temp. (°F.) | FOAM BEAD DENSITY (LB/FT$^3$) | | |
|---|---|---|---|
| | 2 min. | 3 min. | 5 min. |
| 300 | 4.7 | 4.3 | — |
| 325 | 3.3 | 2.7 | — |

Thus, the polymer compositions of the present invention comprising the melt compounded product are suitable for use in preparing expandable polystyrene foam beads for use in various applications.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A polymer composition which comprises a melt-compounded product of (a) a polyphenylene oxide polymer; and (b) a recycled polystyrene material, wherein the recycled polystyrene material is derived from bromine-modified polystyrene which exhibits a melt flow index greater than about 25 hen devolatized by heating above its glass transition temperature.

2. A polymer composition as defined by claim 1, wherein the recycled polystyrene material exhibits a melt flow index greater than about 50 when heated above its glass transition temperature.

3. A polymer composition as defined by claim 1, wherein the recycled polystyrene material exhibits a melt flow index greater than about 100 when heated above its glass transition temperature.

4. A polymer composition as defined by claim 1, wherein the recycled polystyrene material comprises bromine-modified polystyrene foam which has been devolatized by heating above its glass transition temperature.

5. A polymer composition as defined by claim 4, wherein the recycled polystyrene material comprises bromine-modified polystyrene extruded foam which has been devolatized by heating above its glass transition temperature.

6. A polymer composition as defined by claim 4, wherein the recycled polystyrene material comprises bromine-modified expanded polystyrene foam beads which have been devolatized by heating above their glass transition temperature.

7. A polymer composition as defined by claim 1, wherein the recycled polystyrene material has been devolatized by heating above its glass transition temperature by melt compounding the recycled polystyrene material with the polyphenylene oxide polymer.

8. A polymer composition as defined by claim 1, wherein the polyphenylene oxide is included in an amount sufficient to render the recycled polystyrene material processable in a plasticating extruder.

9. A polymer composition as defined by claim 8, comprising at least about 20 weight percent of the polyphenylene oxide, based on the polyphenylene oxide and the recycled polystyrene material.

10. A polymer composition as defined by claim 9, comprising from about 35 to about 80 weight percent of the polyphenylene oxide and from about 65 to about 20 weight percent of the recycled polystyrene material.

11. A polymer composition as defined by claim 1, wherein the polyphenylene oxide polymer comprises poly(2,6-dimethyl-1,4-phenylene) ether.

12. A polymer composition as defined by claim 1, wherein the polyphenylene oxide polymer comprises poly(2,3,6-trimethyl-1,4-phenylene) ether.

13. A polymer composition as defined by claim 1, wherein the polyphenylene oxide polymer is a blend or a copolymer which includes units of 2,6-dimethyl-1,4-phenylene ether and units of 2,3,6-trimethyl-1,4-phenylene ether.

14. A polymer composition as defined by claim 1, further including a second polystyrene resin which is different from the recycled polystyrene material.

15. A polymer composition as defined by claim 14, wherein the second polystyrene resin is selected from the group consisting of polystyrene homopolymers, halogenated polystyrenes, styrene-maleic anhydride copolymers, rubber modified polystyrenes, acrylonitrile-butadiene-styrene copolymers, styrene-acrylonitrile copolymers, poly-alpha-methylstyrenes and mixtures thereof.

16. A polymer composition as defined by claim 1, further including at least one additive selected from reinforcing agents, fillers, plasticizers, impact modifiers, flame retardants, lubricants, colorants, thermal stabilizers, light stabilizers, and antistatic agents.

17. A polymer composition as defined by claim 1, wherein the polyphenylene oxide and the recycled polystyrene material are melt compounded and the resulting extrudate is pelletized or granulated.

* * * * *